US009229759B2

(12) United States Patent
Jujare et al.

(10) Patent No.: US 9,229,759 B2
(45) Date of Patent: Jan. 5, 2016

(54) VIRTUAL MACHINE PROVISIONING USING REPLICATED CONTAINERS

(71) Applicant: Microsoft Corporation, Redmond, WA (US)

(72) Inventors: Madhusudhan R. Jujare, San Jose, CA (US); Hector Linares, Bellevue, WA (US); Natalia Varava, Bellevue, WA (US); Erwien E. Saputra, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 13/653,771

(22) Filed: Oct. 17, 2012

(65) Prior Publication Data

US 2014/0109087 A1    Apr. 17, 2014

(51) Int. Cl.
G06F 9/455    (2006.01)

(52) U.S. Cl.
CPC .... G06F 9/45558 (2013.01); *G06F 2009/4557* (2013.01)

(58) Field of Classification Search
None
See application file for complete search history.

(56) References Cited

U.S. PATENT DOCUMENTS

| 7,401,131 | B2 | 7/2008 | Robertson et al. | |
| 8,141,090 | B1 | 3/2012 | Graupner et al. | |
| 2008/0134175 | A1* | 6/2008 | Fitzgerald et al. | 718/1 |
| 2008/0201709 | A1 | 8/2008 | Hodges | |
| 2011/0314465 | A1* | 12/2011 | Smith et al. | 718/1 |
| 2012/0124189 | A1* | 5/2012 | Haggar et al. | 709/223 |
| 2012/0240110 | A1* | 9/2012 | Breitgand et al. | 718/1 |

OTHER PUBLICATIONS

Lent, Arthur, "NetApp vStorage Integration Intelligent Data Management for VMware", Published on: Apr. 3, 2009, Available at: http://www.netapp.com/us/communities/tech-ontap/tot-vstorage-0309.html.
"Aneka Dynamic Provisioning", Published on: Oct. 22, 2010, Available at: http://www.manjrasoft.com/download/2.0/AnekaDynamicProvisioning.pdf.
Rodriguez, et al., "Dynamic Provisioning of Virtual Clusters for Grid Computing", in Proceedings of Euro-Par Workshops—Parallel Processing, Aug. 25, 2008, 10 pages.

(Continued)

*Primary Examiner* — Emerson Puente
*Assistant Examiner* — Zhi Chen
(74) *Attorney, Agent, or Firm* — Henry Gabryjelski; Harri Valio; Micky Minhas

(57) ABSTRACT

A virtual machine manager that provisions of virtual machines on hosts that share a tenant store. Virtual machines can be provisioned using an arraying subsystem of the tenant store without having to actually physically copy all of the operating system files for each virtual machine. Instead, the arraying subsystem virtually copies the operating system files by generating virtual operating system containers that point to a master operating system container that actually contains operating system content in the tenant store. To increase the limit on the number of virtual operating system containers that can be virtually copied from a master operating system container, the master operating system container may itself by physically, rather than virtually copied. Then, virtual operating system containers may be virtually copied from any of the master operating system containers that contain the same operating system content.

20 Claims, 6 Drawing Sheets

(56) References Cited

OTHER PUBLICATIONS

"Parallels Cloud Server 6.0 Beta Readme", Retrieved on: Jul. 20, 2012, Available at: http://www.parallels.com/fileadmin/parallels/documents/hosting-cloud-enablement/pcs/Readme.pdf.

"vSphere Virtual Machine Administration", Retrieved on: Jul. 20, 2012, Available at: http://pubs.vmware.com/vsphere-50/topic/com.vmware.ICbase/PDF/vsphere-esxi-vcenter-server-50-virtual-machine-admin-guide.pdf.

* cited by examiner

VIRTUAL MACHINE PROVISIONING USING REPLICATED CONTAINERS

BACKGROUND

Virtual machines are code that performs the logic of an operating system and potentially a set of one or more applications as well. However, instead of such logic being performed on a client computing system (the "client") that actually renders the associated user interface, the virtual machine executes on a host computing system (the "host").

In operation, the virtual machine generates images and/or rendering instructions representing the user interface (such as a desktop or application user interface) to be rendered on the client, and causes the host to transmit the same to the client. The client receives the image and/or rendering instructions, and renders the user interface accordingly. The client also receives user input and transmits the same to the host. The virtual machine processes the input and changes the virtual machine state. If such change in state causes a change to the user interface, the changes are transmitted to the client for further rendering. This process repeats rather quickly, and the response time is sufficiently fast, that the user of the client might not be even able to distinguish whether the operating system and perhaps the associated applications are operated on the client or via virtual machine.

A host is capable of running a number of virtual machines. The host typically ensures isolation between the virtual machines. Thus, a single host may provide the operating system logic for a number of remote clients. Each host has a hypervisor that uses underlying physical resources (such as network bandwidth, storage, memory, processing) to provide the appearance to the virtual machine as though the virtual machine has dedicated physical resources. This appearance is referred to as a virtual resource. Thus, each virtual machine may have virtual hard drivers, virtual processors, virtual network bandwidth, virtual RAM and so forth.

In order to provision a virtual machine, the hypervisor should have access to all of the operating system files (and optionally application files if the virtual machine has such applications) necessary for the operating system (and optionally the applications) to run. Rather than physically copy all of these operating system files every time a virtual machine is to be provisioned, the arraying subsystem of the tenant store that the host has access to is used to virtually copy the operating system.

For instance, a master container includes a virtual machine template that contains all of the operating system files, and virtual machine configuration data (for the operating system, and also defining the characteristics of the various virtual devices that the virtual machine is to have). In order to perform the virtual copying, an associated container is created, which has a pointer to the actual content of the master container. The arraying subsystem offers up an instance of the virtual machine container to the hypervisor for each virtual machine to be provisioned following the template of the master container. The hypervisor uses the virtual hardware configuration information to set up virtual hardware for the virtual machine, and the operating system files pointed to by the associated container are used to instantiate the virtual machine. The operating system files in the template may be such that the operating system is pre-configured in a particular way. However, in a customization phase, the virtual machine may be further configured by changing settings through the running virtual machine itself. The virtual container stays associated with the virtual machine until the virtual machine is terminated.

There is a limit to the number of virtual containers that may be virtually copied from a master container. Accordingly, there is a limit to the number of virtual machines that may be running at the same time that each are associated with a distinct virtual containers virtually copied from the same master container.

BRIEF SUMMARY

At least one embodiment described herein relates to an environment in which a virtual machine manager assists in the provisioning of virtual machines on a set of one or more host computing systems that share a tenant store. Virtual machines can be provisioned using an arraying subsystem of the tenant store without having to actually physically copy all of the operating system files for each virtual machine. Instead, the arraying subsystem virtually copies the operating system files by generating virtual operating system containers that point to a master operating system container that actually contains operating system content in the tenant store. The virtual operating system containers are then offered up to the host computing systems, which may provision the virtual machine from the virtual operating system containers.

However, arraying subsystems have a maximum limit on the number of virtual operating system containers that may be virtually copied from a master operating system container. In accordance with the principles described herein, to increase this limit, the master operating system container may itself be physically, rather than virtually, copied. Then, virtual operating system containers may be virtually copied from any of the master operating system containers that contain the same operating system content. Thus, the maximum limit is effectively bypassed, allowing many more virtual machines to be generated indirectly based on the master operating system container.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a virtual machine manager provisions virtual machines on a set of one or more host computing systems that use a tenant store. Virtual machines can be provisioned using an arraying subsystem of the tenant store without having to actually physically copy all of the operating system files for each virtual machine. Instead, the arraying subsystem virtually copies the operating system files by generating virtual operating system containers that point to a master operating system container that actually contains operating system content in the tenant store. To increase the limit on the number of virtual operating system containers that can be virtually copied from a master operating system container, the master operating system container may itself be physically, rather than virtually copied. Then, virtual operating system containers may be virtually copied from any of the master operating system containers that contain the same operating system content. Some introductory discussion of a computing system will be described with respect to FIG. 1. Then, embodiments of the provisioning will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
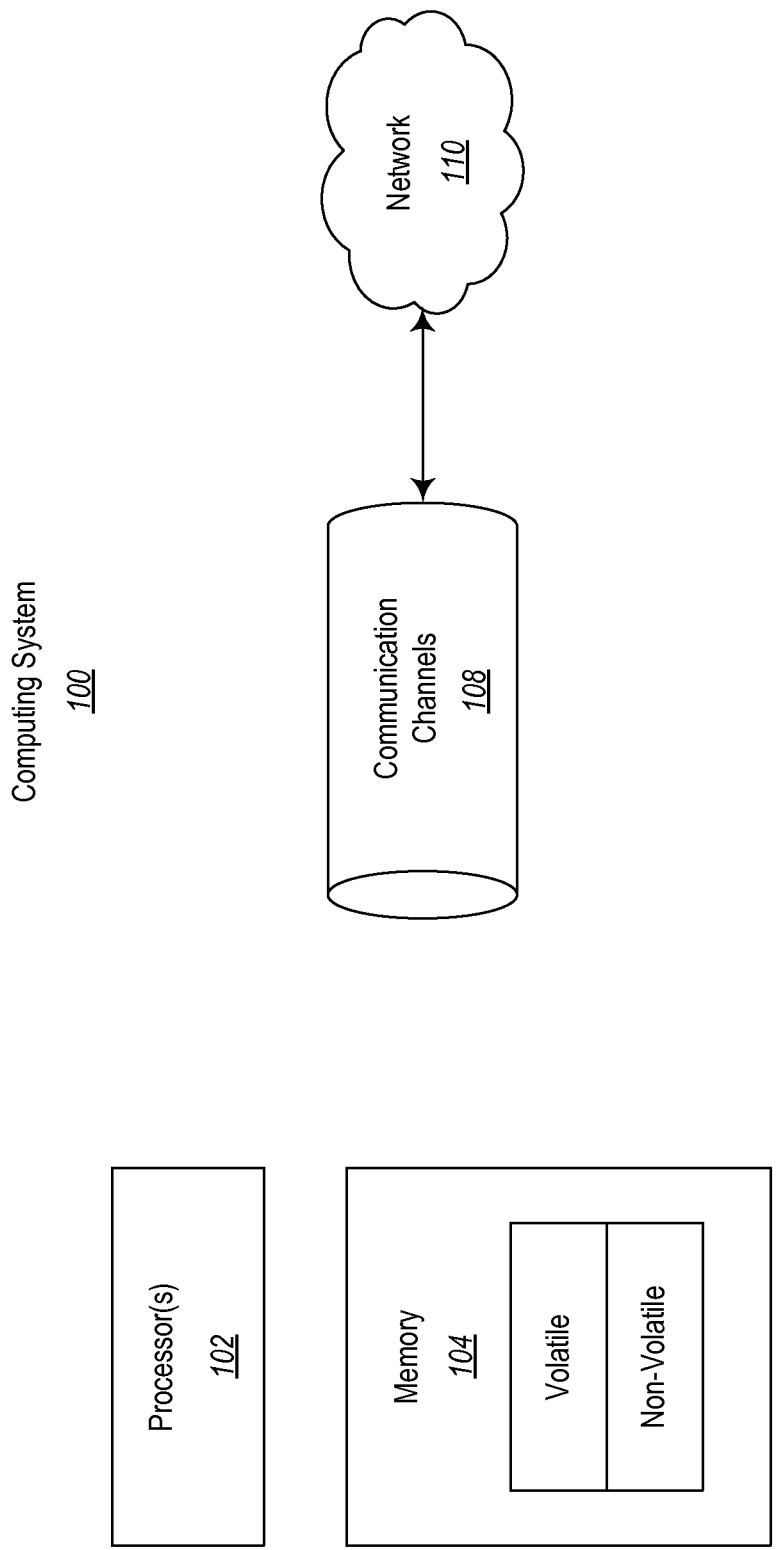
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
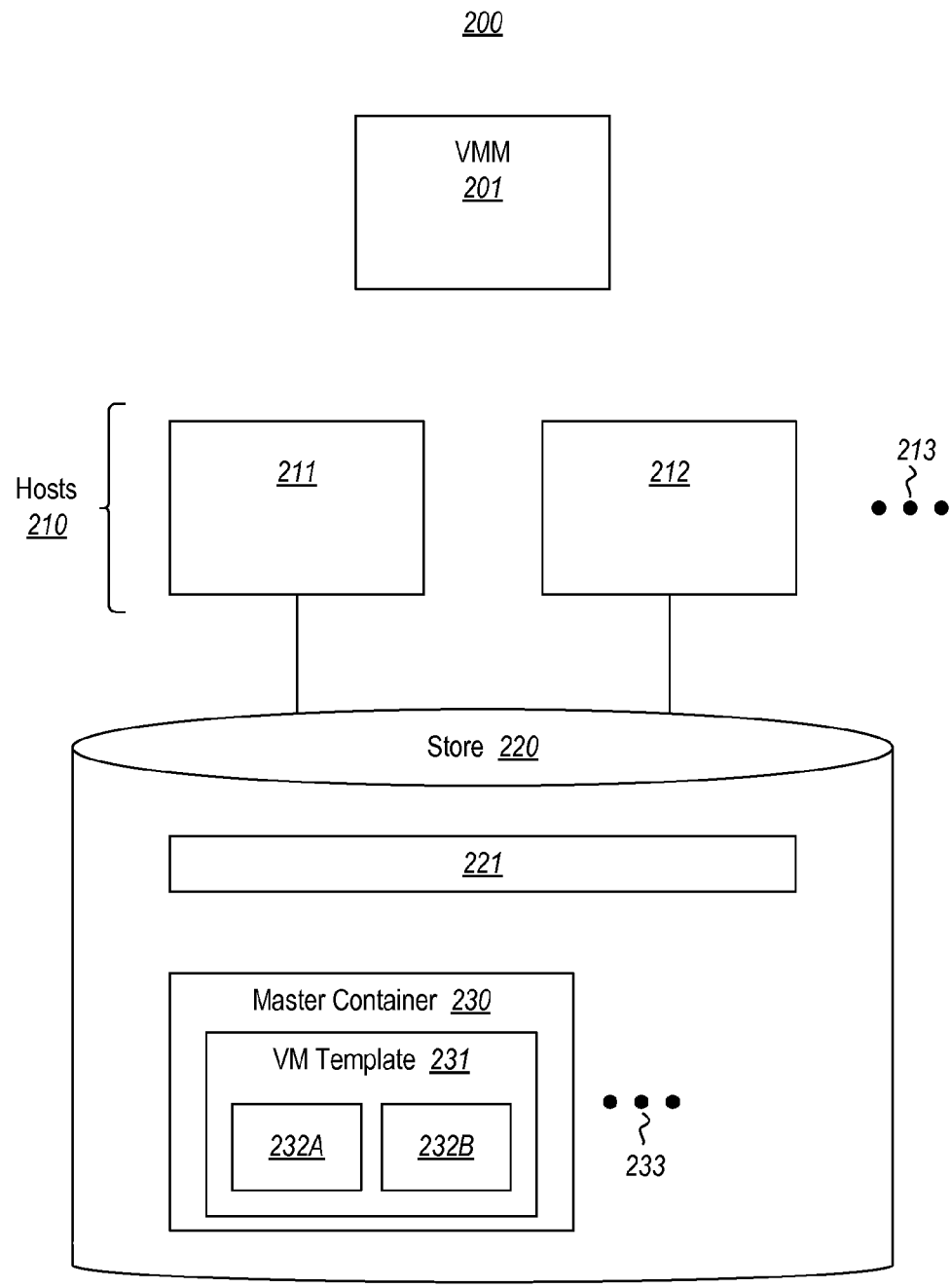
FIG. 2 illustrates an environment that includes multiple components including a virtual machine manager, hosts, and a tenant store.

FIG. 2 illustrates an environment 200 that includes multiple components. The system 200 includes a virtual machine manager 201, hosts 210, and a tenant store 220. The hosts 210 and tenant store 220 may be located in, for example, a tenant environment. The virtual machine manager 201 may also be located in that tenant environment, in the case of the virtual machine manager 201 being a private cloud service that acts for the tenant specifically. Alternatively, the virtual machine manager 201 may be a public cloud service that acts for multiple tenants including a tenant corresponding to hosts 210 and the tenant store 220.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The tenant environment includes host computing systems 210 that share a tenant store 220. Each of the host computing systems 210 may be structured as described above for the computing system 100 or FIG. 1. Additionally, each of the host computing systems is capable of hosting one or more (typically multiple) virtual machines. In FIG. 2, the host computing systems 210 are illustrated as include two host computing systems 211 and 212. However, the ellipses 213 represent flexibility in this number. The principles described herein operate if there is only one, and if there are multiple host computing systems that share the tenant store 220. Furthermore, the ellipses 213 represent that the number of host computing systems in the tenant environment may be dynamic as new host computing systems are added and/or as host computing systems are removed.

The tenant store 220 is accessible by each of the host computing systems 210. As an example, the tenant store 220 may be a storage area network (SAN). The tenant store 220 stores a master operating system container 230 containing a virtual machine template 231 that contains operating system content 232A and hardware configuration content 232B. The ellipses 233 represent that there may be a variety of master containers, each containing a different virtual machine template, within the tenant store 220. The tenant store 220 also includes an arraying subsystem 221 configured to virtually copy and expose a maximum number of virtual operating system containers by virtual copying from the master operating system container.

Figure 3:
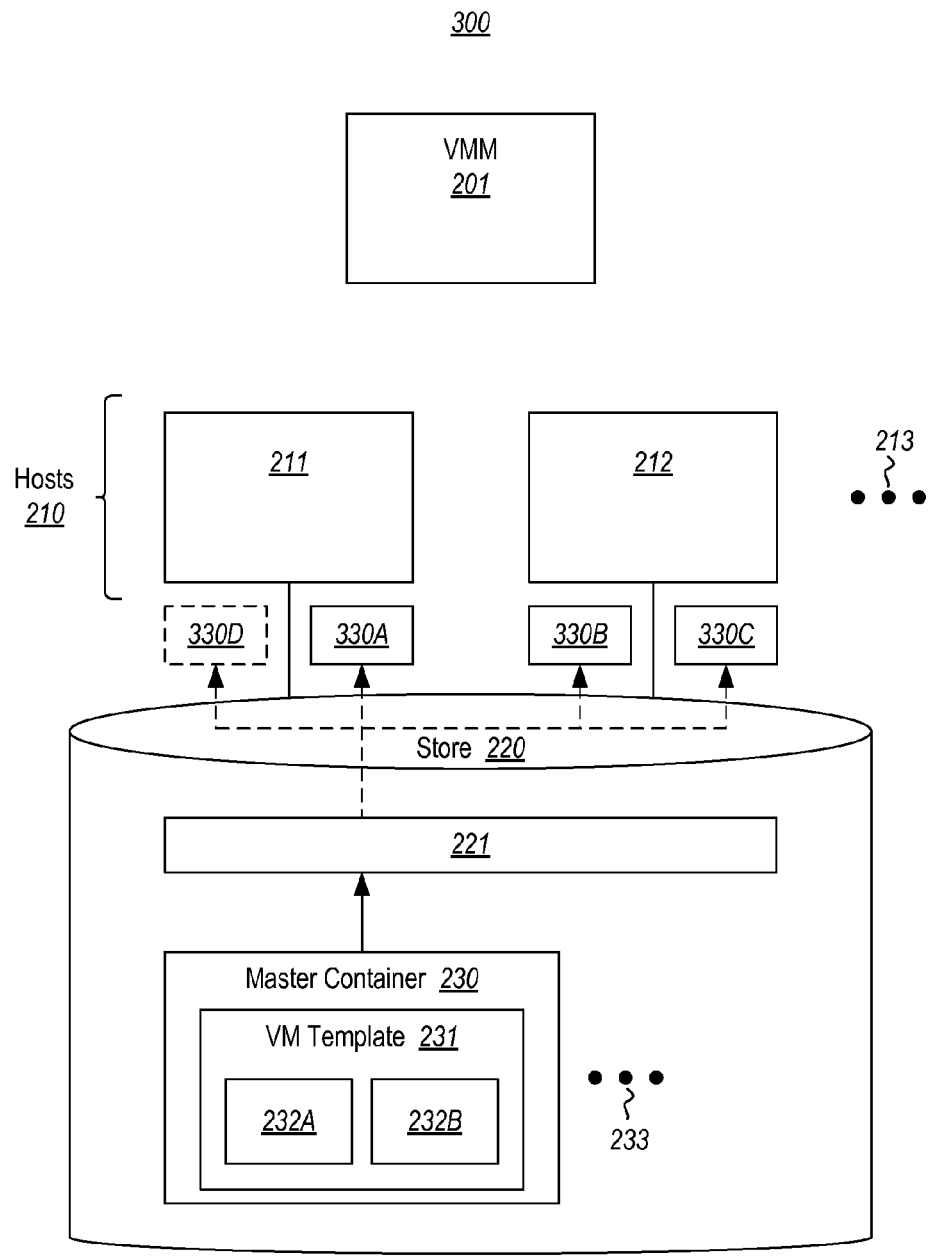
FIG. 3 illustrates an environment, which is similar to the environment of FIG. 2, except that it illustrates that three virtual containers corresponding to the master container are exposed to the hosts.

For instance, suppose that this maximum number were three. A more typical limit might be 64 or 256, but three is chosen for clarity in illustrating the general principles. FIG. 3 illustrates an environment 300, which is similar to the environment 200 of FIG. 2, except that it illustrates that three virtual containers 330A, 330B, 330C corresponding to the master container 230 are exposed (as represented by the dashed lines) to the hosts 211 and 212. Specifically, since one virtual machine based on master template 231 is to be created on host 211, the arraying subsystem 221 offers up a corresponding virtual container 330A to the host 211 to be used to provision and operate that virtual machine. Since two virtual machines based on master template 231 are to be created on host 212, the arraying subsystem 221 offers up to the host 212 one corresponding virtual container 330B for one of the virtual machines, and another corresponding virtual container 330C for the other of the virtual machines. Although the example described herein illustrates and describes a one-to-one correlation between a virtual machine and a virtual container, the principles described herein are not limited to that scenario. A virtual machine may be supported by multiple containers consistent with the principles described herein. For instance, one container might include operating system files, and another might include other resources such as, for example, application files. However, to keep the example simple, the example illustrates just one of the virtual containers that may support each of the virtual machines.

Figure 4:
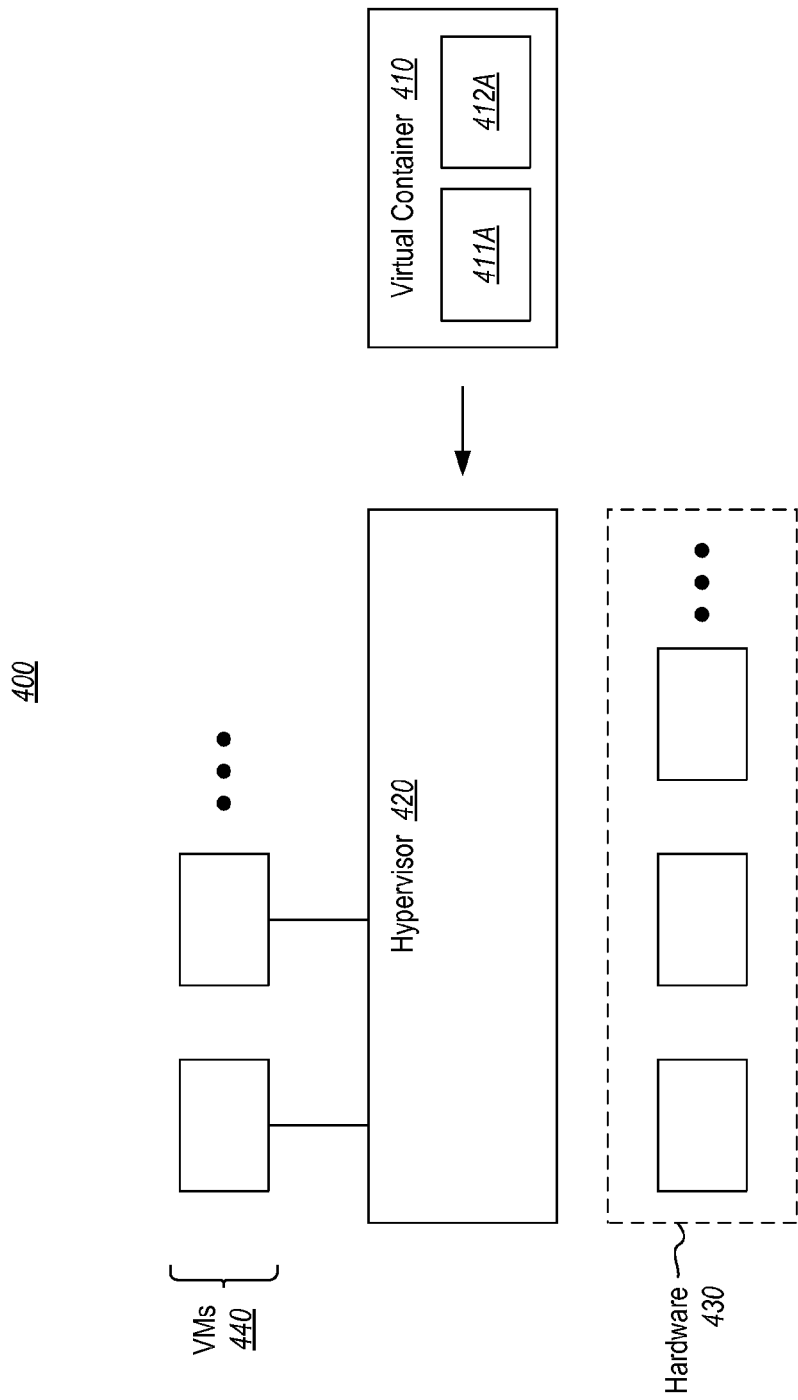
FIG. 4 illustrates a process by which the virtual container may be used to provision a virtual machine.

FIG. 4 illustrates a process 400 by which the virtual container may be used to provision a virtual machine. The virtual container 410 is generated from the master container 230 of FIGS. 2 and 3, and is offered up by the arraying subsystem 221 to the hypervisor 420 of the respective host on which the corresponding virtual machine is to be provisioned. The virtual container 410 contains operating system content 411A, which equates to the operating system content 232A in the master container 230. However, whereas the operating system content 232A includes the operating system files, the operating system content 411A merely points to the operating system content 232A within the master container. Nevertheless, the arraying subsystem abstracts this away from the hypervisor 420 such that the hypervisor 420 simply interacts with the virtual container 410 to use the operating system content. The operating system content includes all of the operating system files to be used for the virtual machine. Such files may also be pre-configured in accordance with the virtual machine template 231.

The virtual container 410 also contains hardware configuration content 412A which describes what virtual hardware the virtual machine is to receive from the hypervisor 420. The hypervisor 420 accesses the hardware configuration content 412A, and responds accordingly to generate a virtual representation of that hardware using the underlying physical hardware 430, which is abstracted away from view of the virtual machines 440. The hypervisor 420 uses the operating system content 411A to spin up (or instantiate) the virtual machine (e.g., one of virtual machines 440). The hypervisor associates the configured virtual hardware with the spun up virtual machine. From here, there may be a potential customization phase in which further customization is performed by interaction with the operating virtual machine.

Referring to FIG. 3, the arraying subsystem 221 offers up three virtual containers 330A, 330B and 330C. Suppose that the arraying subsystem 221 had a maximum limit of three virtual containers that could be generated from a single master container. Suppose now that a fourth virtual machine is to be spun up on host 211, and that this virtual machine is to be based on the master container 230. This could be accomplished by offering up another virtual container 330D based on the master container 230. However, such would exceed the maximum limit. In accordance with the principles described herein, this may be dealt with by physically replicating the master container 230 to generate multiple full copies of the master container, and associating those copies together. While this is helpful when the number of virtual machines to be generated from the master container exceed the number of virtual containers that can be generated from a master container, the principles described herein are not limited to that application. For instance, a master container may be replicated based on an anticipated need if, for example, the maximum limit for a given master container were being approached.

Figure 5:
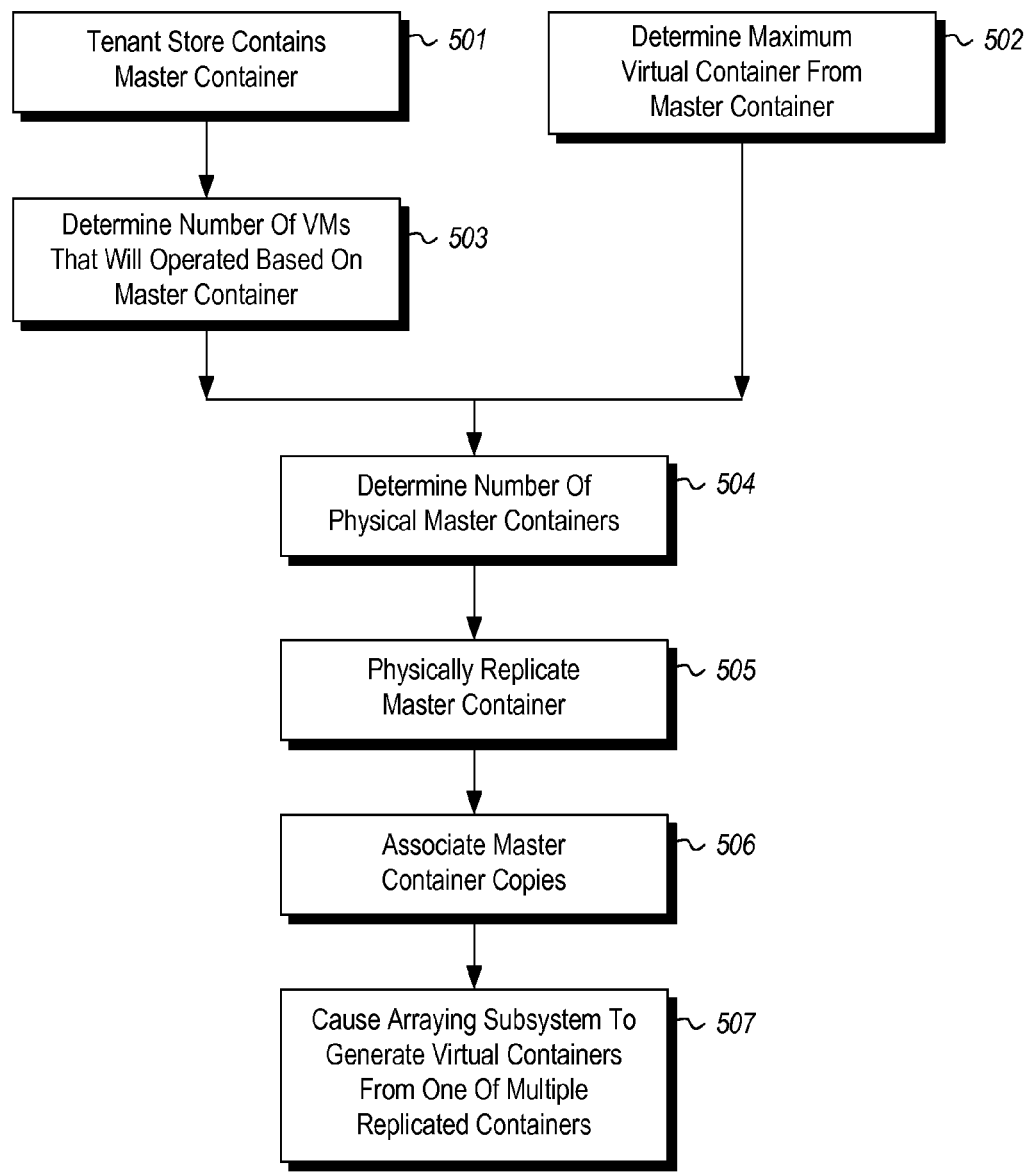
FIG. 5 illustrates a flowchart of a method for supporting provisioning of virtual machines from a master operating system container.

FIG. 5 illustrates a flowchart of a method 500 for supporting provisioning of virtual machines from a master operating system container. As the method 500 may be performed in the context of FIGS. 2 through 4, FIG. 5 will be described with frequent references to FIGS. 2 through 4. The method 500 may be performed by, for example, the virtual machine manager 201 of FIGS. 2 and 3.

The virtual machine manager identifies a tenant store as storing a master operating system container (act 501). A "master operating system container" is a container that envelopes at least operating system content, although in some implementations (such as the master container 230 of FIGS. 2 and 3), the master operating system container may contain other information as well such as hardware configuration content. For instance, in FIGS. 2 and 3, the virtual machine manager 201 identifies tenant store 220 as storing a master operating system container 230. Since this master operating system container will be physically copied, this master operating system container may also be referred to herein as an "origin master operating system container". The act of identifying the tenant store as container the master container (act 501) may be performed well in advance of the virtual machines being provisioned.

The virtual machine manager also determines a maximum number of virtual operating system containers that an arraying subsystem of the tenant store can generate by virtual copying from the origin master operating system container (act 502). For instance, in FIGS. 2 and 3, there is a previously described example in which the limit is three. Accordingly, the creation of virtual containers 330A, 330B and 330C has already caused the arraying subsystem 221 to reach its limit of virtual containers generated from the master container 230. The act of identifying the maximum number of virtual operating systems containers that the arraying subsystem is able to support from a single master container (act 502), may also be performed well in advance of the virtual machines being provisioned. Accordingly, there is no temporal dependency between acts 501 and 502, and thus the acts are shown in parallel.

The virtual machine manager determines a number of virtual machines that will operate from the tenant store that have been or are to be provisioned from an operating system content of the origin master operating system container (act 503). For instance, in the example of FIG. 2, suppose that there are previously no virtual containers based on the master container 230, and that a request is received to provision 4 such virtual machines. This act 503 might, in that case, involve determining to operate 4 virtual machines based on the master container. Alternatively, in the case of FIG. 3, suppose that there are already three virtual containers 330A, 330B, and 330C (corresponding to the virtual machines) that are based on the master container 230. Furthermore, suppose that a request comes in to provision 1 further virtual machine based on the master container (causing one more virtual container 330D to be generated based on the master container). Again, this act 503 might, in that case, involve determining to operate 4 virtual machines based on the master container (including 3 already operating virtual machines plus the 1 represent in the request). While this example involves a maximum limit of 3, more typically, the maximum limit might be 64 or 256.

The virtual machine manager then determines a number of physical master operating system containers that are sufficient to support the number of virtual machines given the maximum number of virtual operating system containers that can be generated from virtual copying the origin master operating system container (act 504). For instance, the virtual machine manager 201 might conclude that two physical copies of the master container 230 would be sufficient to accommodate 4 virtual machines (and four virtual containers) based on the maximum limit for one being 3. In that case, two virtual containers might be virtually copied from each physical copy of the master container. Alternatively, one virtual container might be virtually copied from one physical copy of the master container, and another three virtual containers might be virtually copied from the origin master container.

The virtual machine manager then causes the tenant store to physically replicate the master operating system container such that there is the number of physical master operating system containers in the tenant store (act 505). Referring to FIGS. 2 and 3, the virtual machine manager 201 may issue an instruction to the tenant store 220 (or the arraying subsystem 221) to physically copy the master container 230 to create two copies; namely, the original, and a copy. In that case, each of the physical master operating system containers contain the operating system content 232A and the hardware configuration content 232B, being either the origin master operating system container, or being physically copied from the origin master operating system.

Referring to FIG. 5, the copies of the physical master containers are then associated together (act 506). For instance, in the specific case, the origin master operating system container and the copy of the master operating system container are associated together.

Figure 6:
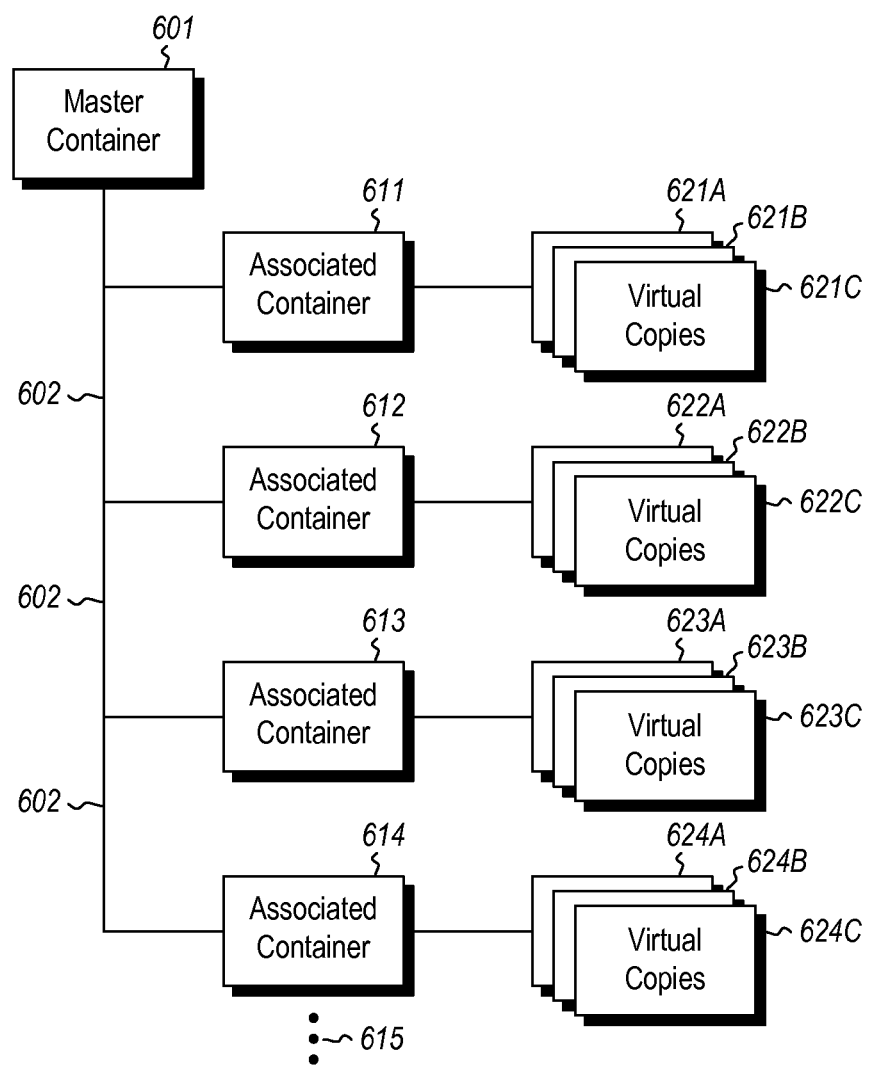
FIG. 6 illustrates an environment in which there are multiple physical copies of a master container, and in which there are multiple virtual copies of each physical copy of the master container.

FIG. 6 illustrates an environment 600 extending this example further. In this case, there are four physical copies 611 through 614 of the same master operating system container 601 (although the ellipses 615 represent that there could be more). In this case, there are twelve virtual copies of the master operating system container 601. However, the twelve virtual copies of the master operating system container 601 are not virtually copied directly from the master operating system container 601 itself, but from one of the physical copies of the master operating system container 601, but honoring the maximum limit of three virtual copies per physical operating system container. For instance, virtual copies 621A, 621B and 621C are virtually copied from a first physical copy 611 of the master operating system container 601. Furthermore, virtual copies 622A, 622B and 622C are virtually copied from a second physical copy 612 of the master operating system container 601. Also, virtual copies 623A, 623B and 623C are virtually copied from a third physical copy 613 of the master operating system container 601. Finally, virtual copies 624A, 624B and 624C are virtually copied from a fourth physical copy 614 of the master operating system container 601.

As represented by associating element 602, each of the physical copies 611 through 614 of the master operating system container 601 are associated together. The arraying subsystem 221 may have a lot of containers, and several containers may function as virtual machine template, just as master container 230 serves as a virtual machine template 231. For instance, consider the following scenario.

Suppose the arraying subsystem has two master containers; specifically, one master container (let us call "container A") for operating system with database server, and one master container (let us call "container B") for operating system with a web server. Accordingly, there are two templates known by the virtual machine manager 201, one template is for the database server using container A, and one template is for web server template using container B.

During high shopping season, the number of web servers needs to be increased. Thus, new virtual machines are created based on the web server template. Such new creations may exceed the limit on the number of virtual copies per physical container. The virtual memory manager 201 overcomes the limit by creating physical copies of the container assigned to the template, associating the physical copies together, and virtually copying the virtual containers from the physical containers as described above.

The association is important as there could be hundreds of containers. By looking at the association, the virtual machine manager 201 knows that there are two classes of the physical containers, one that is used as master container, and the other one is the copy of the master container which was needed to work around the storage limitation.

Although not required, the virtual machine manager may further cause the arraying subsystem to generate a virtual operating system container based on the operating system content for each of the number of virtual machines that will operate from the tenant store that at least are to be provisioned from the operating system content (act 507). For instance, in the case of there being no virtual containers previously, and in the case of receiving a request to generate 4 virtual machines (and thus 4 virtual contains) based on the master container 230, the virtual machine manager 201 might further issues instructions to have the arraying subsystem 221 generate the 4 virtual containers.

Accordingly, an effective system has been described that allows for virtual machines to be provisioned even if the master container upon which they are based exceeds the limits for the arraying subsystem for the number of virtual containers allowed for a given master container.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more hardware storage devices having stored thereon computer-executable instructions that, when the computer-executable instructions are executable by a computing system, the computer-executable instructions cause the computing system to support provisioning of virtual machines from a physical operating system container, comprising the following:
   identifying a first number of virtual operating system containers that can be generated from a physical operating system container;
   determining if a second number of virtual machines that are to be provisioned to support a set of one or more virtual machine hosts exceeds the first number; and
   responsive to determining that the second number exceeds the first number, performing at least the following:
      calculating a third number of physical copies of a master operating system container that would enable an arraying subsystem to generate the second number of virtual operating system containers based on the master operating system container;
      physically replicating the master operating system container to generate the third number of physical copies of the master operating system container at a tenant store, wherein the tenant store stores the master operating system container and any physical copy of the master operating system container;
      associating each physical copy of the master operating system container with the master operating system container and with another physical copy of the master operating system container;
      generating the second number of virtual operating system containers based on the master operating system container, wherein the second number of virtual operating system containers are generated using only the third number of physical copies of the master operating system container; and
      provisioning the generated second number of virtual operating system containers to support the set of one or more virtual machine hosts.

2. The computer program product in accordance with claim 1, wherein the tenant store is a storage area network.

3. The computer program product in accordance with claim 1, wherein the computing system is a tenant-based computing system.

4. The computer program product in accordance with claim 1, wherein the computing system is within a public cloud computing environment.

5. A system comprising:
   one or more hardware processors; and
   one or more hardware storage devices having stored thereon computer-executable instructions representing a virtual machine manager, which is configured to perform the following in response to a request to provision a number of virtual machines based on operating system content of a master operating system:
      identifying a first number of virtual operating system containers that can be generated from a physical operating system container;
      determining if a second number of virtual machines that are to be provisioned to support a set of one or more virtual machine hosts exceeds the first number; and
      responsive to determining that the second number exceeds the first number, performing at least the following:
         calculating a third number of physical copies of a master operating system container that would enable an arraying subsystem to generate the second number of virtual operating system containers based on the master operating system container;

physically replicating the master operating system container to generate the third number of physical copies of the master operating system container at a tenant store, wherein the tenant store stores the master operating system container and any physical copy of the master operating system container;

associating each physical copy of the master operating system container with the master operating system container and with another physical copy of the master operating system container;

generating the second number of virtual operating system containers based on the master operating system container, wherein the second number of virtual operating system containers are generated using only the third number of physical copies of the master operating system container; and provisioning the generated second number of virtual operating system containers to support the set of one or more virtual machine hosts.

6. The system in accordance with claim 5, wherein the virtual machine manager is located within a single tenant environment.

7. A method, implemented at a computer system comprising one or more processors and system memory, for supporting provisioning of virtual machines from a master operating system container, the method comprising:

identifying a first number of virtual operating system containers that can be generated from a physical operating system container;

determining if a second number of virtual machines that are to be provisioned to support a set of one or more virtual machine hosts exceeds the first number; and responsive to determining that the second number exceeds the first number, performing at least the following:

calculating a third number of physical copies of a master operating system container that would enable an arraying subsystem to generate the second number of virtual operating system containers based on the master operating system container;

physically replicating the master operating system container to generate the third number of physical copies of the master operating system container at a tenant store, wherein the tenant store stores the master operating system container and any physical copy of the master operating system container;

associating each physical copy of the master operating system container with the master operating system container and with another physical copy of the master operating system container;

generating the second number of virtual operating system containers based on the master operating system container, wherein the second number of virtual operating system containers are generated using only the third number of physical copies of the master operating system container; and provisioning the generated second number of virtual operating system containers to support the set of one or more virtual machine hosts.

8. The method in accordance with claim 7, wherein the tenant store is a storage area network.

9. The method in accordance with claim 7, wherein the computer system is a tenant-based computer system.

10. The method in accordance with claim 7, wherein the computer system is within a public cloud computing environment.

11. The method in accordance with claim 7, wherein the second number of virtual machines is greater than 64.

12. The method in accordance with claim 7, wherein the second number of virtual machines is greater than 256.

13. The computer program product in accordance with claim 1, wherein the master operating system container is a first type of physical operating system container that enables physical copies to be created therefrom, and wherein each physical copy of the master operating system container is a second type of physical operating system container that is configured to be associated with virtual operating system containers.

14. The system in accordance with claim 5, wherein the master operating system container is a first type of physical operating system container that enables physical copies to be created therefrom, and wherein each physical copy of the master operating system container is a second system container that is configured to be associated with virtual operating system containers.

15. The method in accordance with claim 7, wherein the master operating system container is a first type of physical operating system container that enables physical copies to be created therefrom, and wherein each physical copy of the master operating system container being is a second type of physical operating system container that is configured to be associated with virtual operating system containers.

16. The compeer program product in accordance with claim 1, wherein each physical copy of the master operating system container contains operating system content, and wherein each virtual operating system container points to the operating system content contained in one of the physical copies of the master operating system container.

17. The system in accordance with claim 5, wherein each physical copy of the master operating system container contains operating system content, and wherein each virtual operating system container points to the operating system content contained in one of the physical copies of the master operating system container.

18. The system in accordance with claim 5, wherein the master operating system container is a first master operating system container corresponding to a first virtual machine template, wherein the tenant store also comprises a second master operating system container corresponding to a second virtual machine template, and wherein the virtual machine manager is also configured to generate one or more virtual operating system containers based on the second master operating system container to be provisioned for at least one virtual machine host.

19. The method in accordance with claim 7, wherein each physical copy of the master operating system container contains operating system content, and wherein each virtual operating system container points to the operating system content contained in one of the physical copies of the master operating system container.

20. The method in accordance with claim 7, wherein the master operating system container is a first master operating system container corresponding to a first virtual machine template, wherein the tenant store also comprises a second master operating system container corresponding to a second virtual machine template, and wherein the method also comprises generating one or more virtual operating system containers based on the second master operating system container to be provisioned for at least one virtual machine host.

* * * * *